Aug. 26, 1969 A. J. HACKMAN, JR 3,462,887
PRECISION SURFACE ABRADING
Filed April 25, 1966 4 Sheets-Sheet 1

INVENTOR.
ARTHUR J. HACKMAN JR.
BY William L. Fisher
HIS ATTORNEY

Aug. 26, 1969  A. J. HACKMAN, JR  3,462,887
PRECISION SURFACE ABRADING
Filed April 25, 1966  4 Sheets-Sheet 2
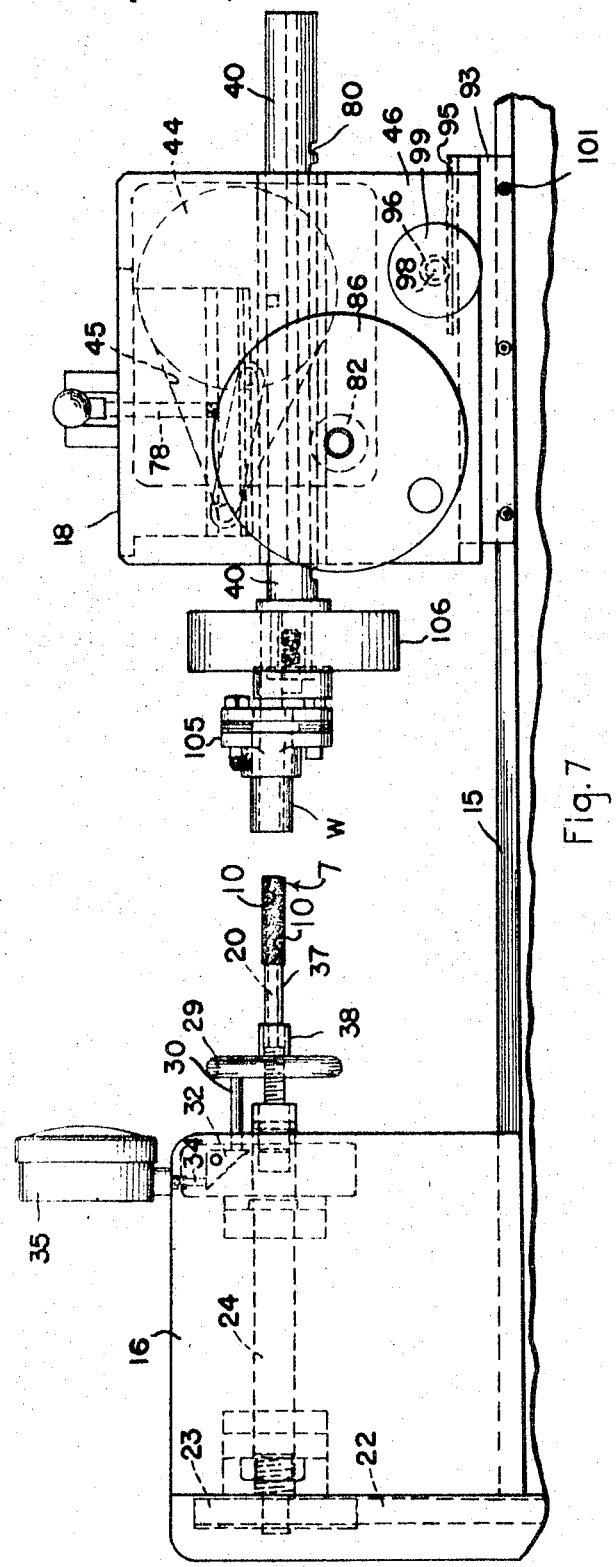
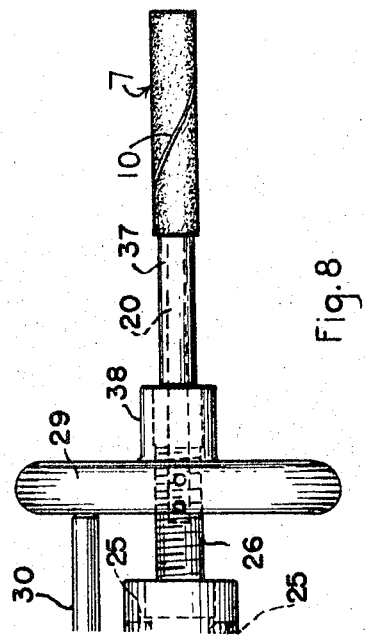
INVENTOR.
ARTHUR J. HACKMAN JR.
BY William L. Fisher
HIS ATTORNEY Aug. 26, 1969   A. J. HACKMAN, JR   3,462,887
PRECISION SURFACE ABRADING
Filed April 25, 1966   4 Sheets-Sheet 4

INVENTOR
ARTHUR J. HACKMAN JR.
BY William L. Fisher
HIS ATTORNEY

United States Patent Office 3,462,887
Patented Aug. 26, 1969

3,462,887
PRECISION SURFACE ABRADING
Arthur J. Hackman, Jr., 611 Rivard,
Grosse Pointe, Mich. 48236
Filed Apr. 25, 1966, Ser. No. 544,940
Int. Cl. B24d 5/14
U.S. Cl. 51—206
14 Claims

ABSTRACT OF THE DISCLOSURE

A precision surface abrading lap is disclosed for surface finishing continuous peripheral surfaces on workparts comprising an annular body having a peripheral lap surface thereon, a diamond abrasive coating of diamond grits bonded to said lap surface, and through slot means through the annular wall of said body to change the radial dimensions of said lap, said lap surface circumferentially continuous except for said through slots means, said lap capable of changing its radial dimensions so as to hold said diamond abrasive coated lap surface precisely in a predetermined radial position in concentric frictional engagement with a workpart surface to be surface finished.

My invention relates to the art of precision surface abrading of metal surfaces by which art finishes on such surfaces can be produced to tolerances in the millionths of an inch.

The principal object of my invention is the provision of improvements in this art by which new vistas are opened and results not heretofore possible are achieved.

Such object of my invention and its advantages will become apparent during the course of the following description, taken in conjunction with the accompanying drawings, in which:

FIG. 1 is a side elevational view, partly broken and in section, of one embodiment of my invention shown in one stage of manufacture;

FIGS. 2 and 3 are opposite end views of said embodiment taken, respectively, along the lines 2—2 and 3—3 of FIG. 1;

FIG. 7 is a side elevational view of a lapping machine capable, when equipped as shown with said embodiment, of carrying out an embodiment of my improved method of precision surface abrading;

FIG. 8 is an enlarged view of a portion of FIG. 7;

Figure 1:
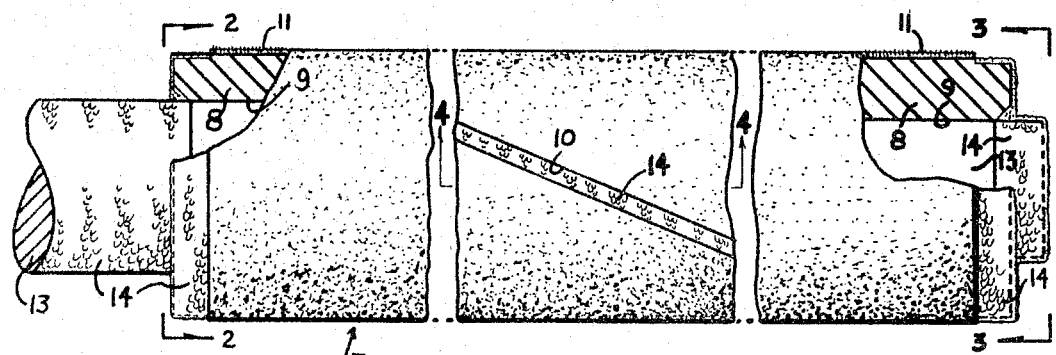
Figure 2:
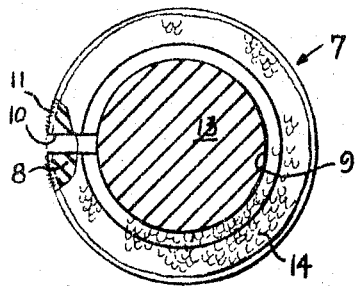
Figure 3:
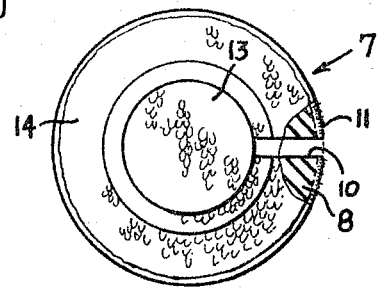
Figure 4:
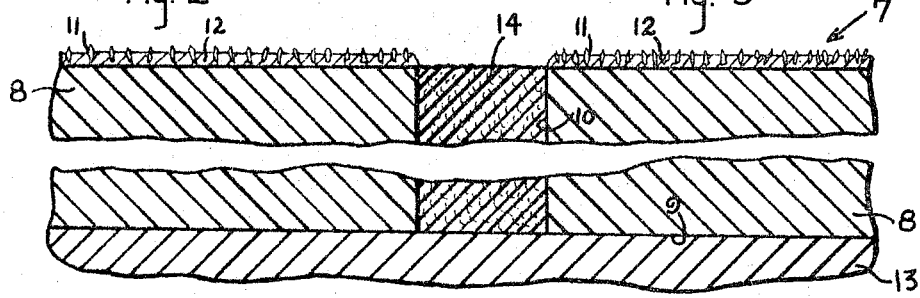
FIG. 4 is a fragmentary longitudinal sectional view of the structure of FIG. 1 taken along the line 4—4 thereof.
Figure 5:
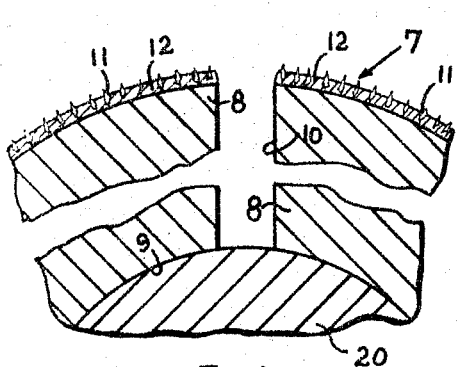
FIGS. 5 and 6 are fragmentary transverse sectional views of said embodiment shown in different circumferentially expanded positions.
Figure 6:
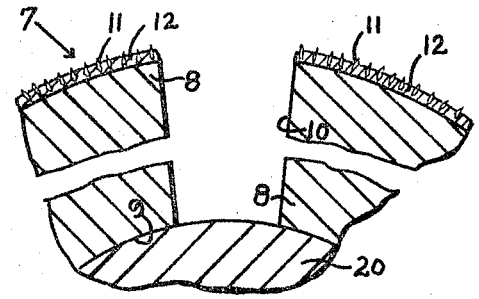
Figure 9:
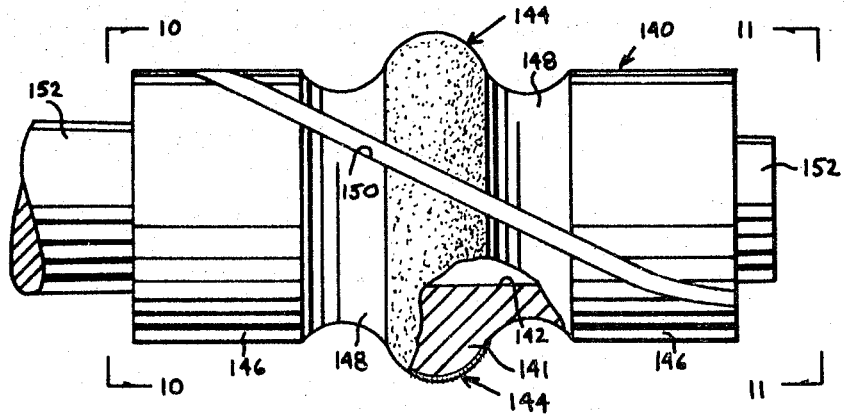
FIG. 9 is a side elevational view, partly in section, of another embodiment of my invention.
Figure 10:
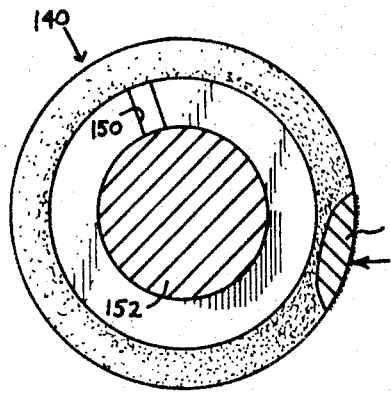
Figure 11:
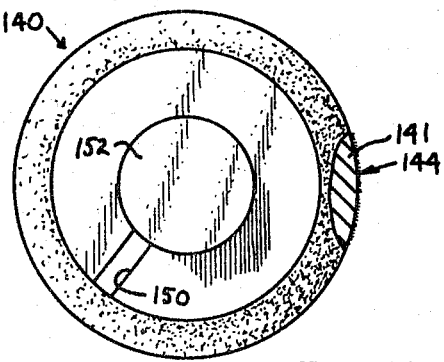
Figure 12:
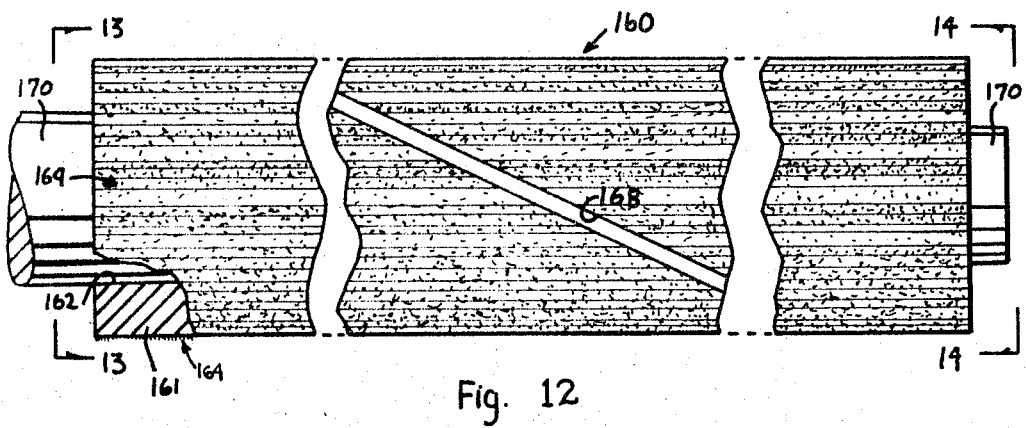
Figure 13:
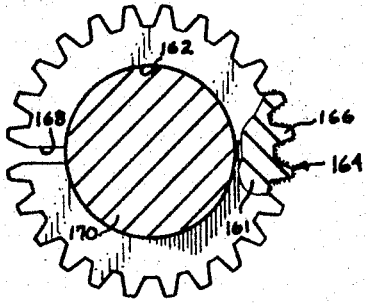
Figure 14:
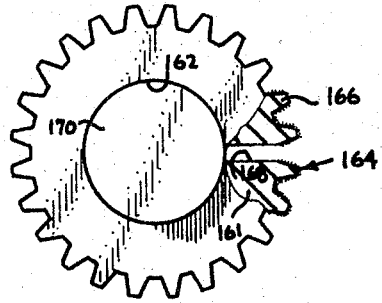
Figure 15:
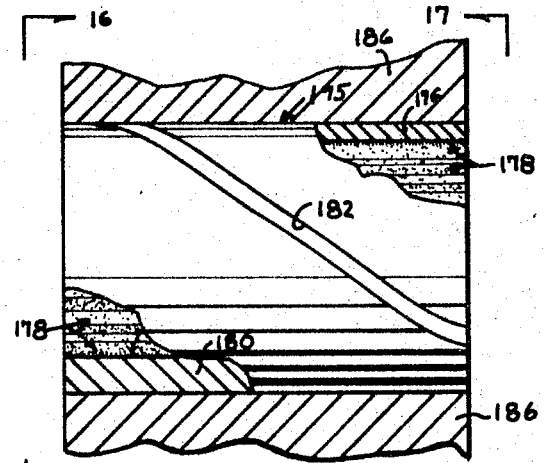
Figure 18:
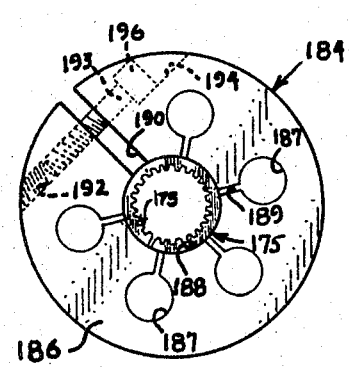
Figure 16:
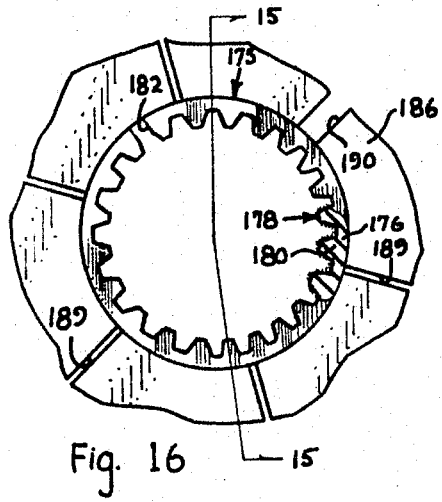
Figure 17:
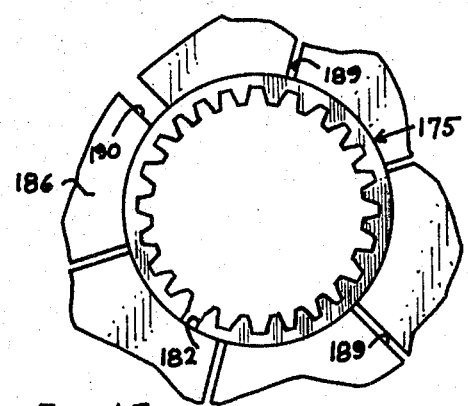

FIGS. 10 and 11 are opposite end views of said other embodiment taken, respectively, along the lines 10—10 and 11—11 of FIG. 9;

FIG. 12 is a side elevational view, partly in section, of still another embodiment of my invention;

FIGS. 13 and 14 are opposite end views of the embodiment shown in FIG. 12 taken, respectively, along the lines 13—13 and 14—14 thereof;

FIG. 15 is a side elevational view, partly in section, of a still further embodiment of my invention; the parts in section being taken on the line 15—15 of FIG. 16;

FIGS. 16 and 17 are opposite end views of the embodiment shown in FIG. 15 taken, respectively, along the lines 16—16 and 17—17 thereof; and FIG. 18 is an end elevational view of the embodiment of FIG. 15 shown in a lap holder.

Referring to the drawings in greater detail and first to the embodiment of my invention shown in FIGS. 1–6, a diamond abrasive coated lap, generally designated 7, is shown therein which comprises an annular body 8 having a uniformly tapered internal opening, which may be a through bore 9, and a straight cylindrical lap surface having a diamond abrasive coating of diamond grits bonded thereto. The body 8 has a through-slot construction through its annular wall preferably extending the length of the lap in the form of a helical slot 10 which spirals about 360 degrees from one end of the lap to the other. Such diamond abrasive coating comprises diamond grits 11 bonded to such outer surface by being embedded in an electroplated metal coating 12 on said outer surface. By diamond grits is meant grits of natural diamonds or synthetic materials of hardness and wearability equal to or greater than natural diamonds such as synthetic diamonds. Embedment of diamond grits 11 in the electroplated metal coating 12 on such outer surface is accomplished by immersing such outer surface in an electroplating bath and suspending diamond grits therein while electrolytically plating out a metal coating on said surface to form thereon a layer of the electrodeposited metal having the diamond grits embedded therein, each such grit particle being substantially surrounded and enveloped by the electroplated metal coating as shown in the drawings. For hard metal workpart surfaces to be finished the diamond grits should be arranged in the coating so that they are randomly dispersed in different radial positions so as to continuously expose fresh sharp diamond cutting edges as the lap surface wears.

I follow well-known electroplating methods generally but vary therefrom in accordance with my invention to produce my improved lap. For example, a lap which is to have a straight cylindrical outer surface finished to an O.D. of 0.250 inch is first ground to a true cylindrical surface of 0.242 O.D. within 1 ten thousandths of an inch as determined by a T.I.R. (total indicator) reading. It is then press fitted on the end of an arbor such as arbor 13 shown in FIGS. 1–4 to its lowest expansion point so that it seals its internally tapered bore 9 and remains on the arbor throughout the coating process. The free end of the arbor 13 protrudes approximately 1/16 of an inch beyond an end of the lap 7 in such lowest expansion point. The slot 10 is filled with a stop-off material 14, such as paraffin wax or other non-conductive substance, and the ends of the lap, including the undercut cylindrical surfaces and end chamfers, thereon as shown in FIGS. 1–4, are covered with such material 14. The exposed surfaces of the arbor 13 such as the vertical face on its free end and the circumferential surfaces inwardly of the lap are similarly covered with such material 14.

The covered arbor 13 with the partly covered lap 7 thereon is made the cathode with the metal, such as nickel, to be electroplated the anode in an electroplating bath containing a commercially available plating solution such as a nickel sulphate electrolyte known as "Watts" solution (32 oz. nickel sulphate, 6 oz. nickel chloride and 4 oz. boric acid per gallon water). Good commercial practice in the electroplating art is followed as to anode spacing from the lap, voltage, current density and the like. During the nickel plating the arbor 13 is rotated slowly and diamond grits, for example, of 180–200 grit size, are added to the bath and kept in suspension by periodic agitation so that they surround the lap and gradually embed themselves in the electroplated nickel coating as it is being formed. An identical bath without diamonds is also employed to lay down a sealer coat of nickel upon the diamond abrasive layer. Each time the lap is removed from the diamond-containing nickel plating bath for gaging it is preferably immersed in the diamond-free nickel plating bath for an overlay nickel coating for the purpose of laying down a final sealer layer of nickel. When the thickness of the diamond abrasive coating is sufficient to produce a lap with an O.D. of 0.250 inch measured against the diamond peaks (a coating of 0.004 inch on each wall) the coating process is terminated. The diamond grits 11 are embedded in the electroplated nickel coating 12 to about ⅔ of their average height.

The diamond abrasive coating is under compression which produces forces transmitted through the electroplated nickel layer 12 to hold the individual diamond grits 11 more securely. These compression forces holding the diamond grits more securely become stronger as the lap is changed radially to increase the frictional surface engagement between the work part surface and the diamond abrasive coated lap surface. The nickel layer withstands these compressive forces without cracking or checking in any way at all.

The electrolyte with the diamond grits dispersed therein can be continuously withdrawn from the electroplating zone and continually recirculated back into such zone for settling of the diamond grits by gravity on the slowing rotating lap as disclosed in Grazen U.S. Patent 3,061,525. The lap may be mounted in the electroplating bath without rotating it and periods of quiescent plating may be used interrupted from time to time by disturbance of the diamond grit in contact with the lap as disclosed in Seligman et al. U.S. Patent 2,360,798. The outer cylindrical surface of my improved lap may first be given a flash electroplated coating of another metal, such as silver, to enhance the bond between the steel surface and the electroplated nickel layer.

The size of the diamond grits which are introduced into the plating bath is determined by a number of factors among which is the size of the lap and its intended application. The diamond grits will vary from about 60-80 grit size down to about 450-500 grit size. In general the coarser grit size diamond grits are used on the larger diameter laps but in most instances it is the finish required on the finished part which dictates the diamond grit size of the lap. For automobile type finishes in automotive production 64 to 16 micro finishes as measured on a surface finish analyzer are adequate in most instances in which cases a 100-150 diamond grit size lap would be suitable. This diamond grit size lap or one even coarser may be used to obtain the required geometry in the workpart. A 130-150 diamond grit size lap will produce about a 16 micro finish. In the event a finer finish is desired or a coarser diamond grit size lap is employed as a roughing-in tool a finer diamond grit size lap may be used in follow up as a finishing tool. For example, a 230-250 diamond grit size lap will produce a 4 micro finish; a 280-300 diamond grit size lap will produce a 2 micro finish; a 1 micro finish can be produced with 350-400 and finer diamond grit size laps. The diamond abrasive coated laps may be made as small as about 40 thousandths of an inch in diameter and as large as about 8 inches in diameter. The diamond abrasive coating may vary between about 1 and 5 thousandths of an inch thick on each wall. Upon completion of the coating process the lap 7 is removed from the arbor 13 and cleaned of any remaining stop-off material 14. Thereupon the diamond abrasive coating may be dressed to size by grinding with a diamond abrasive grinding wheel or the first few workparts to be surface finished may be used to dress the diamond abrasive coating.

By virtue of my improved lap 7 it is possible to carry out my improved lapping method which comprises relatively moving a metal workpart and my improved lap in frictional surface engagement with each other while the diamond abrasive coating on my improved lap is held in precise radial position in respect to the workpart surface to be finished. In the case of the diamond abrasive coated lap 7 the workpart and said lap are simultaneously reciprocated and rotated relative to and axially of each other while the lap 7 is held in a radially expanded position.

My method is best carried out in the case of the lap 7 by supporting the same on a tapered support via its internally tapered bore 9 and shifting the lap 7 axially on its support to radially expand it uniformly over its entire length. The lap and workpart are then simultaneously rotated and reciprocated relative to each other with the lap in the workpart so that the diamond abrasive coated cylindrical outer surface of the lap 7 carries out a precision surface abrading operation on an internal surface of the workpart. After carrying out such a precision surface abrading operation the lap is further expanded radially to a larger uniform circumference of such diamond abrasive coated cylindrical outer surface by shifting the lap 7 axially on its support. The simultaneous rotation and reciprocation is then repeated to carry out a repeated precision surface abrading operation on the workpart internal surface at such larger uniform circumference of such diamond abrasive coated cylindrical outer surface. The workpart may be axially reciprocated relative to the lap while rotating the latter about its central longitudinal axis by mounting my improved lap on an arbor of my lapping machine described and claimed in my prior copending application Ser. No. 296,730 filed July 22, 1963, now U.S. Patent 3,247,622 issued Apr. 26, 1966, which is incorporated herein by reference herewith. A more complete understanding of the construction and operation of said machine may be had by referring to the drawings and to the description of said prior co-pending application now U.S. Patent 3,247,622.

In FIGS. 7 and 8 I have shown by improved lap 7 fitted on the free end of a tapered arbor 20 of my lapping machine ahead of a spacer member 37 which contacts a hub 38 of a screw-threaded handwheel 29 which may be pre-set for a given axial position of the lap 7 on the arbor 20. The setting of the handwheel 29 can be duplicated by virtue of the position indicating gauge 35 which is actuated by a rod 30 slidable in the headstock 16 and moveable in response to the axial movement of such handwheel. Turning of the handwheel 29 to move it toward the free end of the arbor 20 backs the lap 7 off the arbor. Turning of the handwheel 29 in the reverse direction does not move the lap 7 unto the arbor. To do this the lap 7 must be tapped until it abuts solidly against the spacer member 37 which in turn similarly abuts against the hub 38 of the handwheel 29. Tapping of the lap 7 unto the arbor is accomplished by the handwheel 86 which must be pushed inwardly of the tailstock 18 while such handwheel 86 is being rotated. Rotation of the handwheel 86 in one direction moves the shaft 40 (and the workholder 105 which is carried on said shaft 40) axially of the tailstock 18 so that the lap 7 enters into the workholder 105 where it bears against an annular shoulder 130 of a bushing 120 carried in the rear of the workholder 105. The workpart W is carried inside of the barrel 122 of the workholder 105 and telescopes over the lap 7 when the latter enters the workholder 105 to be tapped. By intermittent and slight rotations of the handwheel 86 such bushing 120 within the workholder 105 is used to tap the lap 7 and move it unto the arbor 20. As the lap 7 is tapped unto the arbor 20 it expands radially uniformly over its length, due to its uniformly tapered internal bore 9 corresponding to the taper on the arbor 20 and due to the radial expansion means 10 in the instance. Over expension of the lap 7 is prevented by its being positioned within the bore of the workpart W as described while the lap 7 is being tapped onto the arbor 20. The axial position of the lap 7 on the arbor 20 is set as desired by alternately tapping the lap 7 unto the arbor 20 as described and backing the lap 7 off the arbor 20 by turning the handwheel 29. The desired setting of the lap on the arbor is determined either by measurement or by art which comes with experience in working with my machine.

After the lap 7 is set on the arbor 20 the latter is rotated rapidly by a variable speed drive (not shown) driving the pulley wheel 23 and shaft 24 via the belt 22. The shaft 24 is connected to the arbor 20 to rotatably drive it by a threaded adapter 26 which threadably engages the handwheel 29. The lap 7 is thus rotated on its central longitudinal axis by being fitted on the rotatable arbor 20 and a workpart W whose internal aperture is to be finished is carried in the workholder 105 and rapidly reciprocated over the lap 7 so that the lap, via the diamond abrasive coated surface thereon, carries out a precision surface abrading operation on the workpart aperture. The reciprocation of the workpart W is cyclic and accomplished by reciprocating the low inertia, bearing supported, shaft 40 carrying the workpart W via the workholder 105 by cyclic reciprocation means which includes the flywheel 44 and other components described in said prior copending application now U.S. Patent 3,247,622. As metal removal on the workpart surface proceeds the lap 7 may be expanded radially to a larger uniform circumference of such diamond abrasive coated lap surface as needed by re-setting the axial position of the lap 7 on the arbor 20 as described. The relative rotation and reciprocation of the lap 7 and the workpart W is repeated to carry out a repeated precision surface abrading operation in the workpart bore at such larger circumference of such diamond abrasive coated lap surface. This process of alternately adjusting such uniform circumference and repeating such relative rotation and reciprocation is carried out or continued only if and as necessary until the workpart aperture is finished to the desired diameter within the tolerance specifications set for the particular job. A free abrasive compound is not used with my improved lap 7 as is the case with the smooth surfaced lap 27 shown in said prior copending application now U.S. Patent 3,247,622.

The method of diamond abrasive coated lapping described is different in kind from anything known heretofore in this art. Such method is different in kind from that described in said prior copending application now U.S. Patent 3,247,622 in which a free abrasive compound is employed in conjunction with a smooth surfaced lap such as the lap 27 as shown in said application. As an example, just about as often as machined workparts with internal bores must be heat treated a camber or bow is imparted to the longitudinal axis of such workpart bore by such heat treating, and in order to straighten out the bore a surface abrading operation must be performed thereon. The bore may sometimes be straightened by honing but in honing the honing stones are forcefully pressed against the walls of the bore and tend to flex with the camber in the workpart bore. The result is that the low spots are abraded nearly as much as the high spots and straightening of the workpart bore is difficult. To a lesser extent the smooth surfaced lap 27 also tends to flex with the camber in the workpart bore due to its slow cutting and as it does so the free abrasive compound causes abrading of the low spots along with the high spots. In contrast, my diamond abrasive coated lap abrades the high spots about 5 times faster and the low spots about 5 times slower than with smooth surfaced lapping with the result that the workpart bore is straightened out with surprisingly much less metal removal. There is little or no tendency for my diamond abrasive coated lap to flex with the camber in the workpart bore which is thought to be due to the individuality and extreme sharpness of the peaks of the diamond grits. In some instances the camber is so bad or other conditions exist that straightening cannot be accomplished except by my improved method of lapping. Steel workparts of 52 Rockwell C hardness having bores 2 inches long and ¼ inch diameter which were cambered 50 millionths of an inch from heat treating were subjected to surface abrading operations by honing, by smooth surfaced lapping with a free abrasive compound and by my improved method of lapping with my diamond abrasive coated lap. The amount of metal removed as measured by a T.I.R. (total indicator) reading before the bore was straightened in such workparts treated by the three methods mentioned were, respectively, in the order mentioned 6, 5 and 1 ten thousandths of an inch stock removal. The bores in these workparts were continuous surface through bores with no intersecting apertures or lands or other complicated internal surfaces. Where the internal surfaces are interrupted it makes no difference with either method of lapping whereas honing is not a desirable method of surface finishing such bores because the honing stones tend to distort and destroy the geometry of such a workpart bore.

Many such workparts as described but with straightened bores were subjected to further surface abrading operations by the same three methods. It was found that in the 16 to 4 micro finish range for the same surface finish, e.g., 16 micro finish, only 5 such workparts could be produced per honing stone or per straight surfaced lap using a free abrasive compound per 5 thousandths stock removal whereas 500 such workparts could be produced per the same amount of stock removal per my improved method of lapping. In the 3 to 1 micro finish range which is too fine for production honing it was found that for the same surface finish only 15 such workparts could be produced per smooth surfaced lap per 1 thousandths stock removal whereas 500 such workparts could be produced per the same amount of stock removal per my improved diamond abrasive coated lap. With my improved method of lapping a plowed effect is produced on the workpart surface. Instead of sharp V's as is produced with honing and to a lesser extent with smooth surfaced lapping with a free abrasive compound my improved method of lapping produces flattened crests and valleys. In the 16 to 4 micro finish range a 4 micro finish produced by my improved method of lapping has equivalent mechanical surface properties of a 2 to 3 micro finish difficulty produced by experimental honing. Ths means that for a given surface finish in this range a workpart finished by my improved method of diamond abrasive coated lapping would wear slower and last longer than one finished by honing. Where other workparts slide in frictional surface contact with the finished workpart surface such mechanical surface properties are extremely important. In the 3 to 1 micro finish range a 2 micro finish produced by my improved method of lapping has equivalent mechanical surface properties of a 1 micro finish produced by smooth surfaced lapping with a free abrasive compound.

From my experience in this art supported by comparative tests I have performed with these three methods of metal surface abrading I have found that using my lapping machine smooth surfaced lapping with a free abrasive compound and my improved method of lapping are precision productions methods of metal surface abrading as the term is used herein and are distinguished from honing on this account. Tolerances 10 times closer and finishes 4 times finer are obtainable with these precision methods of surface abrading over that which can be obtained with honing. My improved lapping method is at least 3 times faster than either honing or smooth surfaced lapping insofar as metal removal is concerned. Insofar as total lapping time is concerned there is an even greater difference between my improved method of lapping and smooth surfaced lapping as approximately ¼ of the total elapsed time in lapping with the latter method is taken up in making adjustments of the axial position of the lap on the arbor whereas with my improved method of lapping a lesser number of such adjustments are needed for a given application. As far as the geometry of the workpart is concerned my improved method of lapping will correct camber far better than either honing or smooth surfaced lapping with a free abrasive compound as demonstrated above. A workpart may have diametral roundness and still have a camber to its longitudinal axis. With my improved method of lapping straightness through the workpart from one end thereof to the other can be produced to 2 to 3 millionths as measured by a T.I.R. (total indicator) reading. Both methods of lapping will correct out of roundness and bell mouthing of workpart apertures quickly and easily and both will produce finishes of 1 to 1½ micro finish in production. With honing, on the other hand, there is an inherent tendency to produce bell mouthing at the ends of the workpart bore. Honing can correct out of roundness but only difficulty with workparts having other than straight through bores. Surface finishes of 3–6 micro finish are about the best that can be expected with production honing. With either straight lapping with a free abrasive compound or my improved method of lapping finishes of even ½ micro finish can be produced on workparts far easier than a 2 micro finish can be produced with experimental honing. With honing roundness of 75 millionths is about the best that can be produced on a workpart surface whereas 3–5 millionths roundness can be produced with smooth surfaced lapping or with my improved method of lapping. Where the workparts have interruptions and lands in the bore roundness of 100 millionths is the best that can be produced with honing for a given grit size, e.g., 150 grit size. With my improved method of lapping roundness of 3–5 millionths can be produced on the same workparts and produce an equivalent surface finish, e.g., 16 micro finish.

Referring to the embodiment of my invention shown in FIGS. 9–11, a diamond abrasive coated lap 140 is shown therein which comprises an annular body 141 having a uniformly tapered internal bore 142 and an external lap surface having a diamond abrasive coating bonded thereto. Such diamond abrasive coating has the same constituent elements as in the case of the diamond abrasive coating of the prior embodiment 7, viz, diamond grits, the same as the diamond grits 11, embedded in an electroplated metal coating, the same as the coating 12, on said arcuate outer surface. In the case of the embodiment 140 such diamond abrasive coating is designated 144. Embedment of the diamond grits in the electroplated metal coating on the arcuate outer surface of the lap 140 so as to form the diamond abrasive coating 144 is accomplished as before described in conjunction with the diamond abrasive coating of the prior embodiment 7 of my invention. The external surface on which the diamond abrasive coating 144 is formed is spherically convex in axial profile and is on a center section of the lap 140 in the instance. Joined to such center section are end sections 146 which have straight cylindrical outer surfaces. The end sections 146 are joined to the center section by intermediate spherically concave sections 148 immediately adjacent to the center section. The diamond abrasive coated center section projects outwardly of the end sections 146 radially to reach into internal arcuate surfaces on workparts to carry out via the diamond abrasive coating 144 precision surface abrading operations thereon. The concave intermediate sections 148 project inwardly of the end sections 146 in a similar manner to facilitate such precision surface abrading operations carried out by the diamond abrasive coated center section. In the lapping of ball bearing races, for example, it is sometimes desirable to tilt the longitudinal axis of the lap 140 while it is rotating rapidly within the ball bearing race carrying out a precision surface abrading operation thereon. The concave intermediate sections 148 allow the lap 140 to be thusly tilted either clockwise or anti-clockwise. The body 141 has a through-slot construction through its annular wall preferably extending the length of the lap in the form of a helical slot 150 which spirals about 120 degrees from one end of the lap to the other. The axial profile on the outer peripheral surface of the lap 140 is formed thereon while the lap 140 is in a radially expanded position in respect to the ball bearing race form which it is intended to surface finish on workparts taking into account the thickness of the subsequent applied diamond abrasive coating 144. The diamond abrasive coating 144 is formed on the entire profile of the lap such as the ball bearing face form shown so that the lap 140 can precisely finish the ball bearing race form desired in the workparts.

My improved lapping method may be carried out with the diamond abrasive coated lap 140 by axially rotating relative to each other a metal workpart and the lap 140 held in precise radial position in respect to the workpart surface to be finished. In the case of the lap 140 my method is best carried out by supporting the lap on a tapered arbor 152 and shifting the lap 140 axially on the arbor 152 to expand it radially so that the diamond abrasive coating 144 is at the precise radially expanded position desired. The lap 140 is then rotated at a high speed within the workpart and with the diamond abrasive coating 144 in frictional surface engagement with the workpart internal surface to be finished to carry out a precision surface abrading operation thereon. Thereafter the lap 140 may be further expanded radially as necessary to finish the workparts to the required tolerance and surface finish specifications. In the manufacture of ball bearing races the industry was never interested in lapping because the latter process took 2–3 minutes to remove the stock (of the order of 2–3 thousandths) which could be removed in about 15–20 seconds by grinding. A roundness of 35–50 millionths can be achieved if the grinding is carefully carried out with continuous dressing of the grinding wheel simultaneously with the grinding operation. By my improved method of diamond abrasive coated lapping the required amount of stock can be removed in the same short time period of 15–20 seconds but the roundness achieved by my method is within 5 to 10 millionths roundness as determined by a T.I.R. (total indicator) reading. With present tolerances 100 millionths interferences are presently expected in the fit of ball bearing races with the result that a lobing or camming effect is produced on the inner race. With my improved method of lapping much closer tolerances can be held in the finishing of ball bearing races with the result that interferences of 20 millionths would be a maximum. My method of improved lapping in addition to being 5 to 7 times more accurate than presently known methods of finishing ball bearing races is a far simpler method since the requirement of dressing the grinding wheel, in the case of grinding, or the honing stone, in the case of honing, is eliminated entirely. In the case of small races where small grinding wheels and honing stones must be made the job is even harder and the advantages of my improved method of lapping are more pronounced.

Referring to the embodiment of my invention shown in FIGS. 12–14, a diamond abrasive coated lap 160 is shown therein which comprises an annular body 161 having a uniformly tapered internal bore 162 and an external toothed lap surface having a diamond abrasive coating bonded thereto. The diamond abrasive coating is designated 164 and is identical to the diamond abrasive coatings of the prior embodiments. The external toothed lap surface on which the diamond abrasive coating 164 is formed comprises a plurality of circumferentially disposed uniformly spaced identical teeth 166 as shown. Said teeth 166 correspond to the teeth of an internal workpart gear form intended to be precision surface finished by said lap 160. The body 161 has a through-slot construction through its annular wall preferably extending the length of the lap 160 in the form of a helical slot 168 which spirals about 180 degrees from one end of the lap to the other. The external toothed lap surface of the lap 160 is formed thereon while the lap is in a radially expanded position in respect to the internal workpart gear form which it is intended to surface finish taking into account however the thickness of the subsequently applied diamond abrasive coating 164. The diamond abrasive coating 164 is formed on the entire external toothed lap surface of the lap so that the lap can precisely finish the internal workpart gear form desired in the workparts. Heat treating of gears causes them to distort and my lap 160 corrects such distortion as well as other defects, e.g., bellmouthing at each end of the gear and out of roundness, from the particular process of producing the gear form in the workparts. The same applies to spline forms and the lap can made with an external spline form lap surface having a diamond abrasive coating thereon.

My improved method may be carried out with the diamond abrasive coated lap 160 by axially reciprocating relative to each other a metal workpart and the lap 160 held in precise position in respect to the workpart surface to be finished. In the case of the lap 160 my method is best carried out by supporting the lap on a tapered arbor 170 and shifting the lap 160 axially on the arbor 170 to expand it radially so that the diamond abrasive coating 164 is at the precise radially expanded position desired. The lap 160 is then reciprocated at high speed within the workpart and with the diamond abrasive coating 164 in fractional surface engagement with the internal gear form to be finished on the workpart to carry out a precision surface abrading operation thereon. There after the lap 160 may be further expanded radially as necessary to finish the workparts to the required tolerance and surface finish specifications.

Referring to the embodiment of my invention shown in FIGS. 15–18, a diamond abrasive coated lap 175 is shown therein which comprises an annular body 176 having a straight cylindrical external surface which is compressed to cylindrically contact the lap 175 as will be described. The body 176 has an internal toothed lap surface having a diamond abrasive coating bonded thereto. The diamond abrasive coating is designated 178 and is identical to the diamond abrasive coatings of the prior embodiments. The toothed internal lap surface on which the diamond coating 178 is formed comprises a plurality of circumferentially disposed uniformly spaced identical teeth 180 as shown. Said teeth 180 correspond to the teeth of an external workpart gear form intended to be precision surface finished by said lap 175. The body 176 has a through-slot construction through its annular wall preferably extending the length of the lap 175 in the form of a helical slot 182 which spirals about 120 degrees from one end of the lap to the other. The internal toothed lap surface of the lap 175 is formed thereon while the lap is in a radially contracted position in respect to the external workpart gear form which it is intended to surface finish taking into however the thickness of the subsequently applied diamond abrasive coating 178. The diamond abrasive coating 178 is formed on the entire internal toothed lap surface of the lap so that the lap 175 can precisely finish the external workpart gear form desired in the workparts. My improved lapping method may be carried out with the diamond abrasive coated lap 175 by axially reciprocating relative to each other a metal workpart and the lap 175 held in precise radial position in respect to the workpart surface to be finished. In the case of the lap 175 my method is best carried out by supporting the lap in a contractable lap holder such as the lap holder 184. The lap holder 184 has a cylindrical body 176 with a plurality of uniformly spaced axial apertures 187 circumferentially disposed about a central lap receiving axial opening 188. Radially disposed axial through-slots 189 connect the central opening 188 with the apertures 187. A main radially disposed axial through-slot 190 communicating with the central opening 188 divides the body 186 so that its central opening 188 can be radially contracted. Near the outer end of the slot 190 one of the divided parts of the body 186 is provided with a threaded aperture 192 and the part opposite the slot 190 is provided with an unthreaded aperture 193 having a counterbore 194 in which the head of a screw threaded fastener 196 is disposed. The threaded shank of the fastener 196 threadably engages the aperture 192 to clamp the divided parts of the body 186 about the lap 175 when the latter is carried in the central opening 188 as shown in FIG. 18. Tightening of the fastener 196 in the aperture 192 will radially contract the central opening 188 which in turn radially contracts the lap 175 causing its internal toothed lap surface to radially contract so that the diamond abrasive coating 178 is at the precise radially contracted position desired. The lap 175 is then reciprocated at high speed over the workpart and with the diamond abrasive coating 178 in frictional surface engagement with the external gear form to be finished to carry out a precision surface abrading operation thereon. Thereafter the lap 175 may be further contracted radially as necessary to finish the external gear form on the workparts to the required tolerance and surface finish specifications.

Using presently known means and methods it is difficult to surface finish gears or splines precisely to the correct size and uniformly over the entire gear or spline form because of wear of the finishing tool which must be continually compensated for or non-symmetrical gear or spline forms will result. With my improved laps 160 and 175 there is substantially no wear and no compensation for wear is required. Presently gears are finished with about a 2 micro finish and to 50 millionths roundness and straightness whereas with my improved laps 160 and 175 roundness of 5 to 10 millionths, 5 millionths straightness and finishes to 1 micro inch can be produced on gears or splines.

It will thus be seen that there has been provided by my invention an improved lap and method of lapping in which the object hereinabove set forth together with many thoroughly practical advantages has been successfully achieved. While preferred embodiments of the invention have been shown and described it is to be understood that variations and changes may be resorted to without departing from the spirit of the invention as defined by the appended claims.

What is claimed is:

1. A precision surface abrading lap for surface finishing surfaces on workparts comprising an annular body having a lap surface thereon, a diamond abrasive coating of diamond grits bonded by an electroplated metal layer to said lap surface, the diamond grits embedded in said metal layer, and through slot means through the annular wall of said body to change the radial dimensions of said lap, said lap surface circumferentially continuous except for said through slot means, said lap capable of changing its radial dimensions so as to hold said diamond abrasive coated lap surface precisely in a predetermined radial position in concentric frictional engagement with a workpart surface to be surface finished.

2. A precision surface abrading lap as claimed in claim 1 in which said through-slot means extends the length of the body from end to end thereof.

3. A precision surface abrading lap as claimed in claim 2 in which said through slot means is a helical slot which spirals over the length of the body.

4. A precision surface abrading lap as claimed in claim 1 in which the lap surface extends over the length of the body from end to end thereof and is uniform in axial profile.

5. A precision surface abrading lap as claimed in claim 4 in which the lap surface is a straight cylindrical surface.

6. A precision surface abrading lap as claimed in claim 4 in which the lap surface is non-circular in transverse profile.

7. A precision surface abrading lap as claimed in claim 6 in which the lap surface is in the toothed form of the transverse profile of one of a gear form and a spline form.

8. A precision surface abrading lap as claimed in claim 1 in which the lap surface extends over a portion of the length of the body.

9. A precision surface abrading lap as claimed in claim 8 in which the lap surface is non-uniform in axial profile and circular in transverse profile.

10. A precision surface abrading lap as claimed in claim 9 in which the lap surface is convex in axial profile.

11. A precision surface abrading lap as claimed in claim 10 in which the lap surface is spherically convex in axial profile.

12. A precision surface abrading lap as claimed in claim 1 in which the lap surface is on the external surface of the body and the body is provided with a tapered internal axial aperture.

13. A precision surface abrading lap as claimed in claim 12 in which the tapered aperture is uniformly tapered and extends over the length of the body from end to end thereof.

14. A precision surface abrading lap as claimed in claim 1 in which the lap surface is on the internal surface of the body and the external surface of said body is straight cylindrical.

References Cited
UNITED STATES PATENTS

| | | | |
|---|---|---|---|
| 2,115,461 | 4/1938 | Hartmann | 51—34.2 |
| 2,694,277 | 11/1954 | Speck | 51—346 |
| 2,978,846 | 4/1961 | Barron | 51—206 |
| 3,247,622 | 4/1966 | Hackman | 51—165 |

LESTER M. SWINGLE, Primary Examiner